(12) United States Patent
Kolodji

(10) Patent No.: US 12,179,144 B1
(45) Date of Patent: Dec. 31, 2024

(54) WASTEWATER TREATMENT APPARATUS

(71) Applicant: Brian Kolodji, Bakersfield, CA (US)

(72) Inventor: Brian Kolodji, Bakersfield, CA (US)

(73) Assignee: Black Swan, LLC, Bakersfield, CA (US)

( * ) Notice: Subject to any disclaimer, the term of this patent is extended or adjusted under 35 U.S.C. 154(b) by 399 days.

(21) Appl. No.: 17/682,887

(22) Filed: Feb. 28, 2022

Related U.S. Application Data

(60) Provisional application No. 63/154,632, filed on Feb. 26, 2021.

(51) Int. Cl.
*B01D 53/22* (2006.01)
*C02F 1/72* (2023.01)

(52) U.S. Cl.
CPC ............ *B01D 53/225* (2013.01); *C02F 1/727* (2013.01); *B01D 2256/12* (2013.01); *B01D 2258/05* (2013.01); *C02F 2201/009* (2013.01)

(58) Field of Classification Search
CPC .............................. B01D 53/225; C02F 1/727
See application file for complete search history.

(56) References Cited

U.S. PATENT DOCUMENTS 6,755,898 B2 * 6/2004 Park .................... F24F 8/60
96/10

FOREIGN PATENT DOCUMENTS

SU          1183029 A  *  10/1985

* cited by examiner

*Primary Examiner* — Robert A Hopkins
(74) *Attorney, Agent, or Firm* — James M. Duncan; Scanlon Duncan LLP

(57) ABSTRACT

A system provides oxygen enriched air to a wastewater treatment aeration system by utilizing a membrane unit coupled with a vacuum-generating device which applies a vacuum to the membrane unit thereby pulling out a flow of permeate having an enriched oxygen component. An aeration blower receives the flow of permeate and pressurizes it for delivery to the wastewater treatment aeration system. The membrane units may be in a variety of configurations, including a shell-less membrane. The membrane unit may also provide a stream of oxygen enriched air to a biogas fired power plant or other flue gas generator.

16 Claims, 8 Drawing Sheets

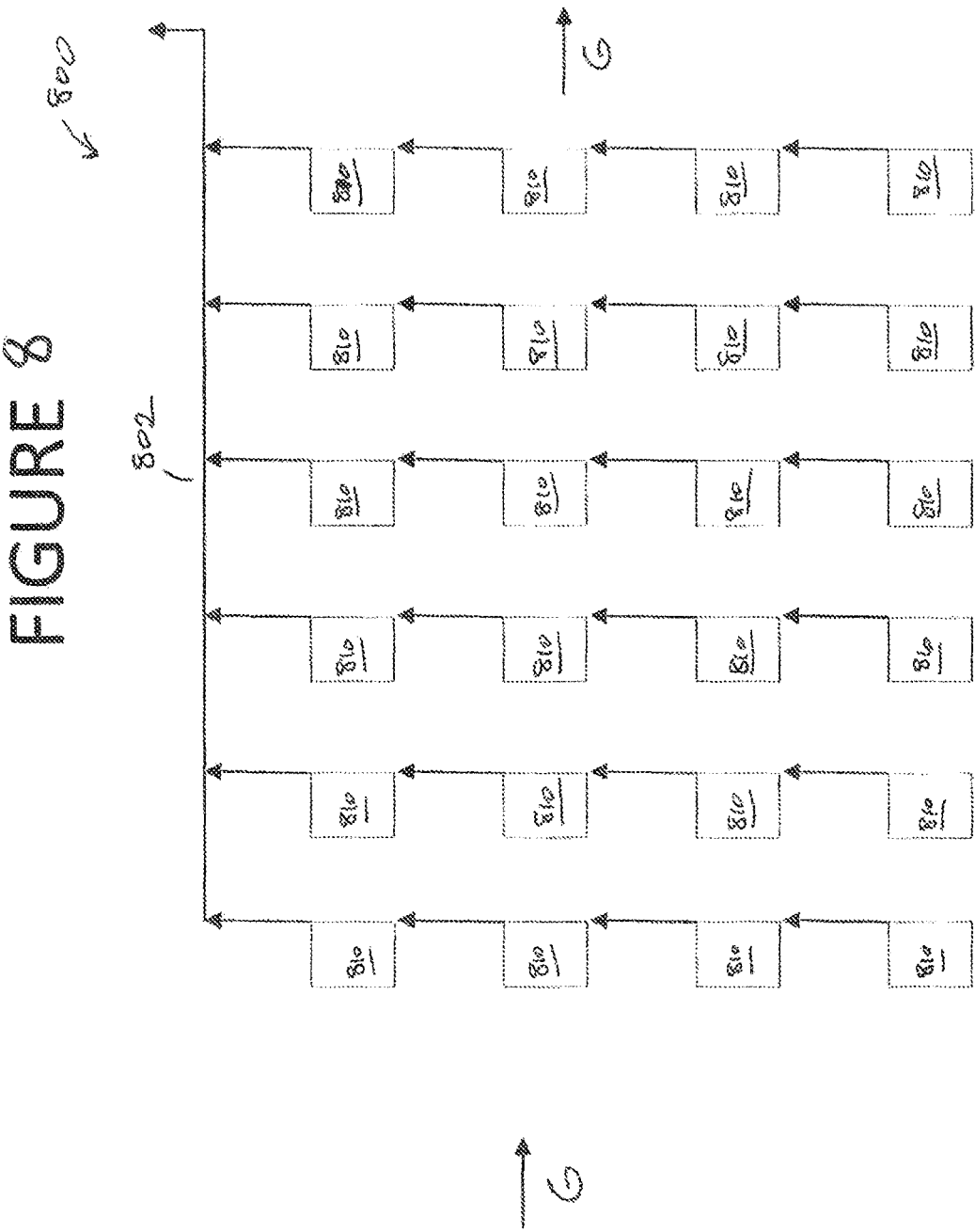

WASTEWATER TREATMENT APPARATUS

RELATED APPLICATIONS

This application is a non-provisional application of U.S. Patent Application No. 63/154,632 filed on Feb. 26, 2021, and claims domestic priority thereto.

BACKGROUND OF THE INVENTION

Embodiments of the present invention may be utilized for treatment of wastewater generated through domestic, industrial and commercial use.

Wastewater treatment facilities typically provide primary and secondary treatment, and often tertiary treatment. Primary treatment involves physical processes which remove materials that float or readily settle out by gravity. These processes include screening, comminution and sedimentation. Secondary treatment includes aeration, trickling filters, or both types of filters acting in in parallel and/or in series. Aeration systems usually (i.e., 99% of systems) have air driven into diffusers in large aeration basins.

Aeration basins are costly and can be difficult to permit. The basins are sized based on water treatment capacity. When capacity goes up, new basins are usually required, meaning additional real estate must be utilized requiring the acquisition of additional property. In locations where real estate expensive, such as in crowed urban locations, the real estate requirement can drive up the expense of expansion tremendously.

Wastewater treatment may also include anaerobic digestion of wastewater solids thereby producing biogas which may be used in cogeneration engines. Cogeneration engines typically require supplementing the fuel with natural gas to help meet the plant's electrical demand.

Another significant cost factor in operating aeration basins is the expense of operating the aeration blowers required in the process.

Some aeration basins are restricted in the size of the basin because of the high expense of real estate. Such installations may be required to utilize pure (i.e., 90%) oxygen which is typically used for the process based on the concept that pure oxygen increases the capacity for wastewater treatment in a given aeration tank volume. However, utilizing pure oxygen presents a variety of operational concerns. The materials required for use with pure oxygen are expensive because the materials must be suitable for cryogenic service temperatures. Oxygen at concentrations of 90+% makes carbon steel flammable. Pure oxygen either requires onsite production in quantities which may approximate 25 tons per day, or it must be trucked in as liquid oxygen and temporarily stored until required. Both of these options add substantial expense to the process.

SUMMARY OF THE INVENTION

Embodiments of the present invention address the above-described problems. Embodiments of the present invention utilize existing equipment and facilities for onsite aeration by enriching atmospheric air utilizing membranes, suction blower and blowers. Embodiments of the present invention can double the capacity of existing wastewater treatment basins, reduce power consumption by approximately 50%, or provide a combination of both. Because of the lower oxygen concentration utilized in the aeration process, the materials utilized in the system are not as expensive as the materials required for pure oxygen applications.

Embodiments of the present invention also reduce greenhouse gases, reduce power consumption costs of aeration, increase water treatment capacity, increase the facility capacity to produce renewable biogas and thus reduce or eliminate the consumption of non-renewable natural gas.

Embodiments of the present invention may utilize membrane units each having a membrane having a first surface and a second surface, where the membrane is configured such that as it receives atmospheric air having a first concentration of oxygen, the first concentration of oxygen is drawn into the first surface and passes through the membrane resulting in a permeate stream exiting the second surface wherein the permeate stream comprises a second concentration of oxygen greater than the first concentration of oxygen. The first surface may be an outer surface and the second surface may be an inner surface, but this is not necessary.

A vacuum-generating device applies a vacuum to the membrane unit and thereby pulls a flow of permeate from the membrane unit. The vacuum-generating device discharges the flow of permeate at a pressure which is at atmospheric pressure or above. The membrane units may be shell-less thereby reducing the energy required for operation of the membrane units.

An aeration blower receives all, or at least a portion, of the flow of permeate and pressurizes it for delivery to an aeration system of a wastewater treatment facility.

A feed blower may be utilized to provide an air flow to the membrane unit.

The membrane unit may also provide a flow of oxygen enriched air to a biogas fired power plant or other flue gas generator.

BRIEF DESCRIPTION OF THE DRAWINGS

FIG. 2A is a sectional view along lines 2A-2A of FIG. 2.

FIG. 3A is a sectional view along line 3A-3A of FIG. 3.

FIG. 4A is a sectional view along line 4A-4A of FIG. 4.

FIG. 4B is a sectional view along line 4B-4B of FIG. 4.

FIG. 5A is a schematic depiction of the individual membrane and spacer sheets of the sheet membrane unit of FIG. 5.

FIG. 8 depicts an embodiment of a bank of membrane units having the general configuration of the membrane units depicted in FIG. 2, FIG. 3, FIG. 4 and/or FIG. 5.

DETAILED DESCRIPTION OF THE EMBODIMENTS

Figure 1:
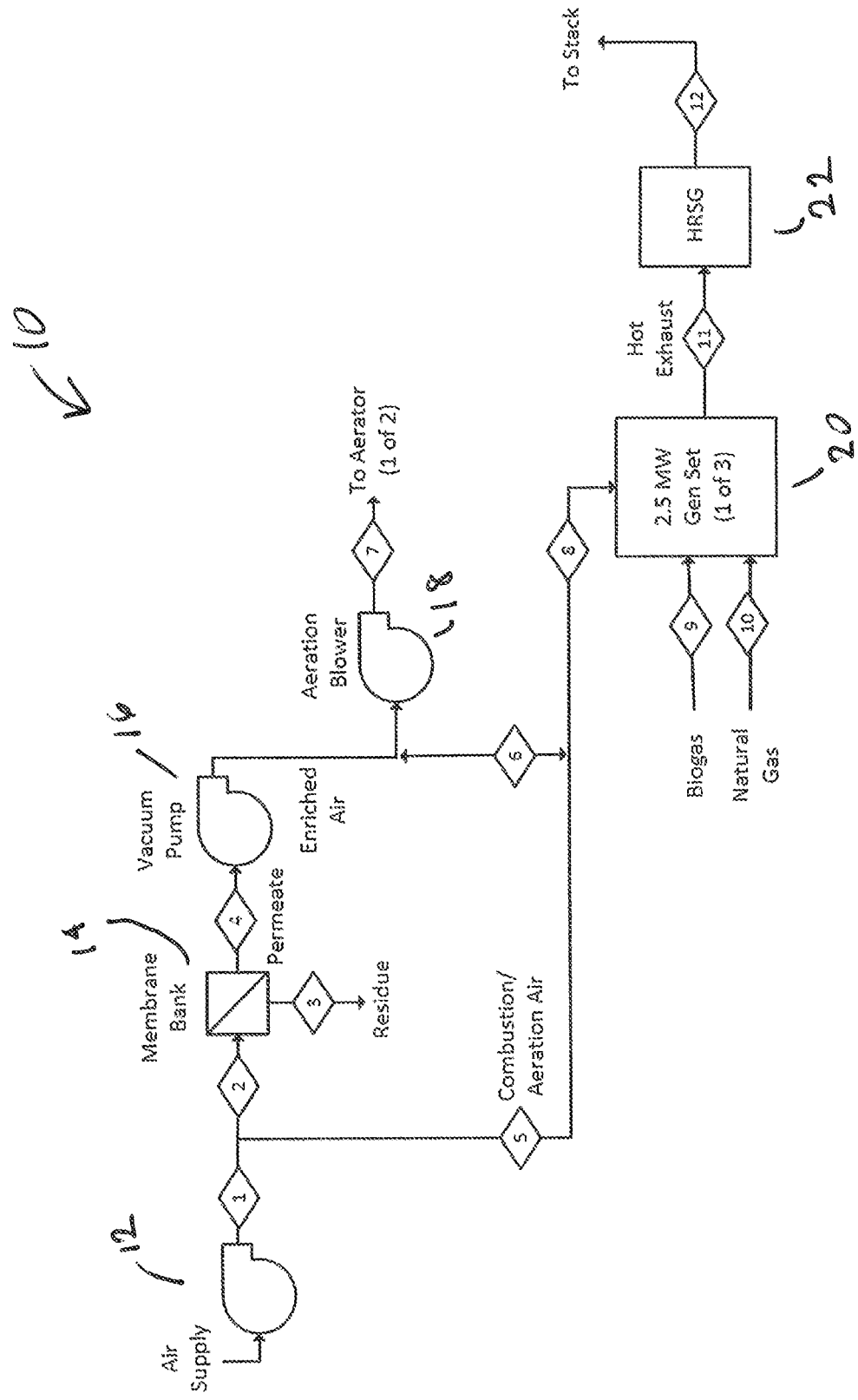
FIG. 1 depicts a flow stream diagram for an embodiment of the presently disclosed system.

An embodiment of the system 10 is depicted in FIG. 1. FIG. 1 shows a variety of different numbered points with Table 1 and Table 2 providing a listing of flow stream properties (i.e., pressure, temperature, mole fraction vapor molecular weight, molar flow, mass flow, etc.) and the mole fractions of the different flow stream components (i.e., oxygen, water, CO2, nitrogen, water, etc.) at each number point for two specific flow conditions. Table 1 shows the results of a flow 25,000 cubic feet/minute using the system of FIG. 1. Table 2 shows, among other things, the impact of embodiments of the present invention on biogas generation. It is to be appreciated that while Table 1 and Table 2 provide flow properties and components for the specified conditions, these are only exemplary of the benefits to be realized by embodiments of the system 10, and the system may be utilized for a variety of different flow conditions.

The system may comprise a feed blower 12, a generic membrane bank 14, a vacuum-generating device 16 and an aeration blower 18. One embodiment of the system 10 may further comprise a biogas fired power plant 20 or other flue gas generator which may deliver flue gas to a heat recovery steam generator 22. Alternatively, flue gas from the biogas fired power plant 20 or other flue gas generator may flow to a cooler, blower and gas dispersion units with the cooled flue gas being brought to grade (i.e., ground elevation).

Generic membrane unit 14 may be configured in a variety of embodiments, including conventional membrane units configured within a shell. With the conventional membrane units, the feed blower 12 is required to process air through the membrane unit. However, the embodiments of membrane units 100, 200, 300, 400 described below eliminate the need for a feed blower, thereby reducing the capital and operating expense of the system.

Figure 2:
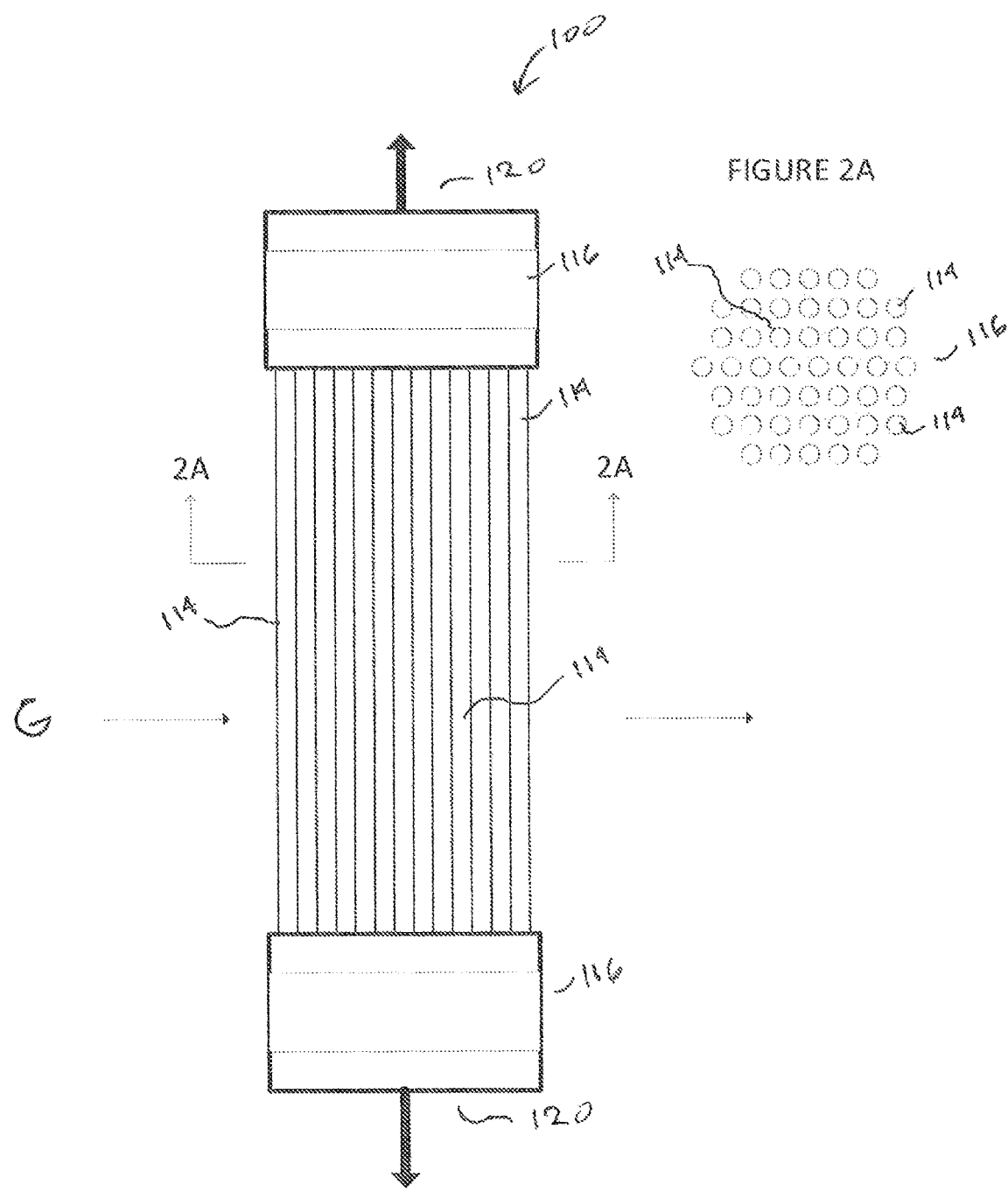
FIG. 2 depicts an embodiment of an ambient air/residue exposed hollow fiber membrane unit wherein there is no shell enclosure, having a "wig" configuration having permeate flow to both hollow fiber membrane tube sheets of the hollow fiber membrane unit.

FIGS. 2 and 2A depict a membrane unit 100 which may be utilized as the generic membrane unit 14 of the of the present invention. Membrane unit 100 has a vacuum applied to it by vacuum-generating device 16. Membrane unit 100 has a "wig" configuration which may be utilized in an open air (i.e., "draft") application. The "wig" designation refers to a construction comprising a plurality of individual hollow fiber membrane elements 114 exposed to gas G (i.e., air) which all pass a gas permeate into a collection member commonly, but not necessarily, at a common end of the membrane elements. Membrane unit 100 has hollow fiber membrane tubes 114, such that the fast gas components (oxygen, carbon dioxide and water vapor) pass more readily through a selective barrier (or first surface) of the walls of tubes 114 than the slow gas components (predominantly nitrogen). In contrast to prior art membrane units, membrane unit 100 has no housing and does not have a discrete inlet comparable to that of inlets of prior art membrane units. Instead, the exteriors of tubes 114 are exposed to air G) of an ambient environment. The fast gas components preferentially flow through the first surface (the exterior surface of the tubes in FIGS. 2, 2A) of each membrane tube 114, with permeate gas flowing out through a second surface (the interior surfaces of the tubes) and flowing out through permeate outlets 120 to aeration blower 18. Gas components making up a "residue" stream, primarily nitrogen, simply comprise those components which do not pass through the walls of the membrane tubes 114 and flow past the membrane unit 100. Membrane unit 100 comprises tubesheets 116, which will be substantially lighter than tube sheets prior art membrane units thereby saving on weight and expense.

Figure 3:
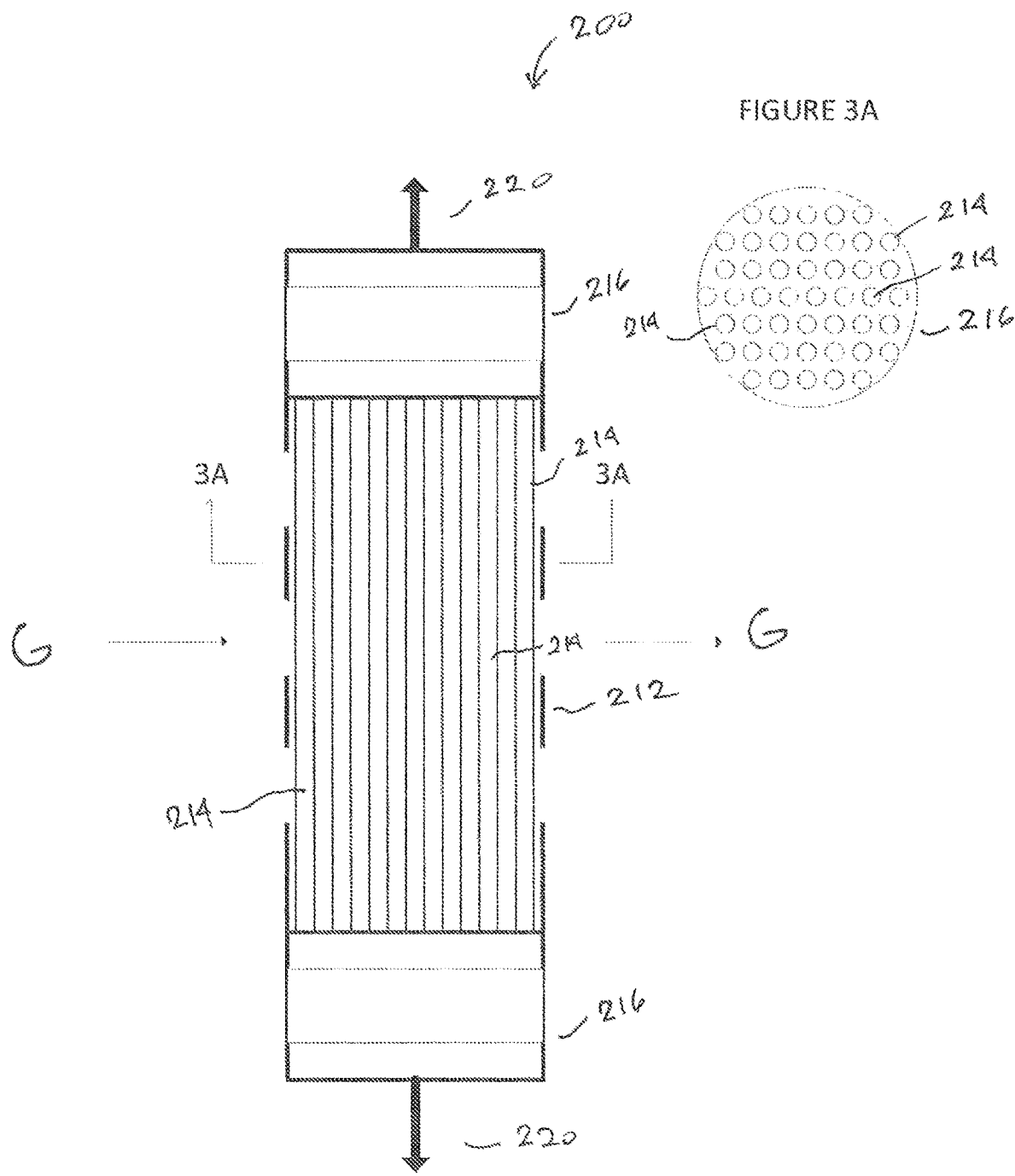
FIG. 3 depicts an embodiment of an ambient air/residue exposed hollow fiber membrane unit having permeate flow to both hollow fiber membrane tube sheets, wherein the membrane tubes are set within a perforated shell of the hollow fiber wig membrane unit.

FIGS. 3 and 3A depict a membrane unit 200 of the present invention depicts an embodiment of a hollow fiber wig membrane unit having a wig configuration having permeate flowing to both hollow fiber membrane tube sheets 216. A vacuum is applied to membrane unit 200 by vacuum-generating device 16. Similar to membrane unit 100, membrane unit 200 comprises a plurality of hollow fiber membrane tubes 214 with each tube having a selective barrier wall which pass fast gas components to the interior of each tube more readily than slow gas components. The resulting permeate flows to the outlets 220 adjacent tube sheets 216 and is transmitted to aeration blower 18. However, in contrast to the embodiments of the membrane unit depicted in FIGS. 2 and 2A, membrane unit 200 is set within a perforated shell 212, thereby providing additional support and containment for the hollow fiber membrane tubes 214.

Figure 4:
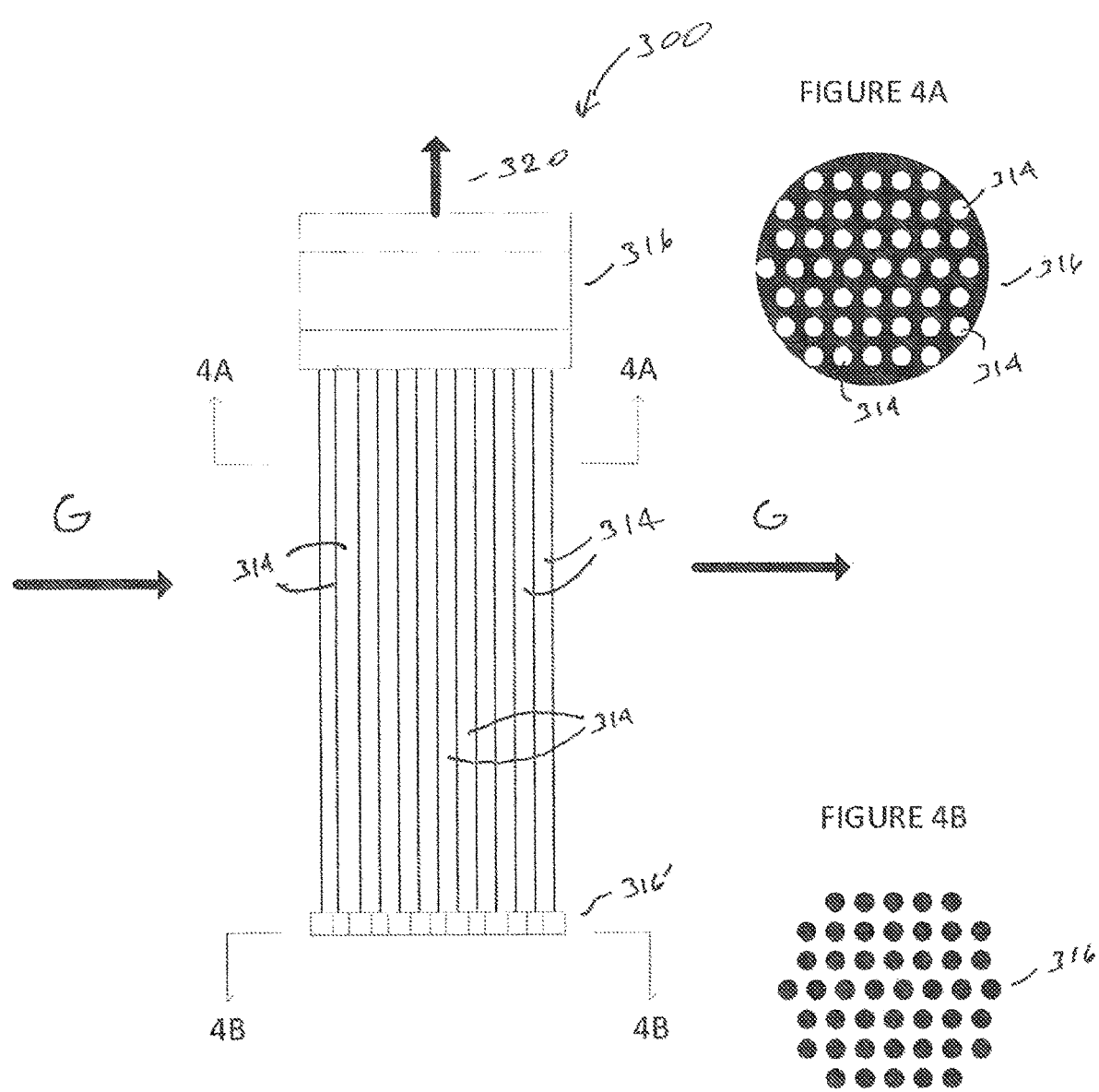
FIG. 4 depicts an embodiment of an ambient air/residue exposed hollow fiber membrane unit wherein there is no shell enclosure, having the tubes blocked on one end of the hollow fiber wig membrane unit

FIGS. 4, 4A and 4B depict an embodiment of a draft hollow fiber wig membrane unit 300 having no shell or enclosure and having permeate flowing to a single tube sheet 316. A vacuum is applied to membrane unit 300 by vacuum-generating device 16. In this embodiment of the membrane unit 300, hollow fiber tubes 314 have one end of each of the hollow fiber tubes 314 blocked with plug sheet 316' which collectively blocks all of the tubes or each tube may be individually plugged or capped. Similar to membrane units 100 and 200, membrane unit 300 comprises a plurality of hollow fiber membrane tubes 314 with each tube having a selective barrier wall which passes fast gas components to the interior of each tube more readily than slow gas components. The resulting permeate has a higher concentration of fast gas components than the ambient gas G flows to the outlet 320 adjacent the tube sheet 316 and transmitted to aeration blower 18.

Figure 5:
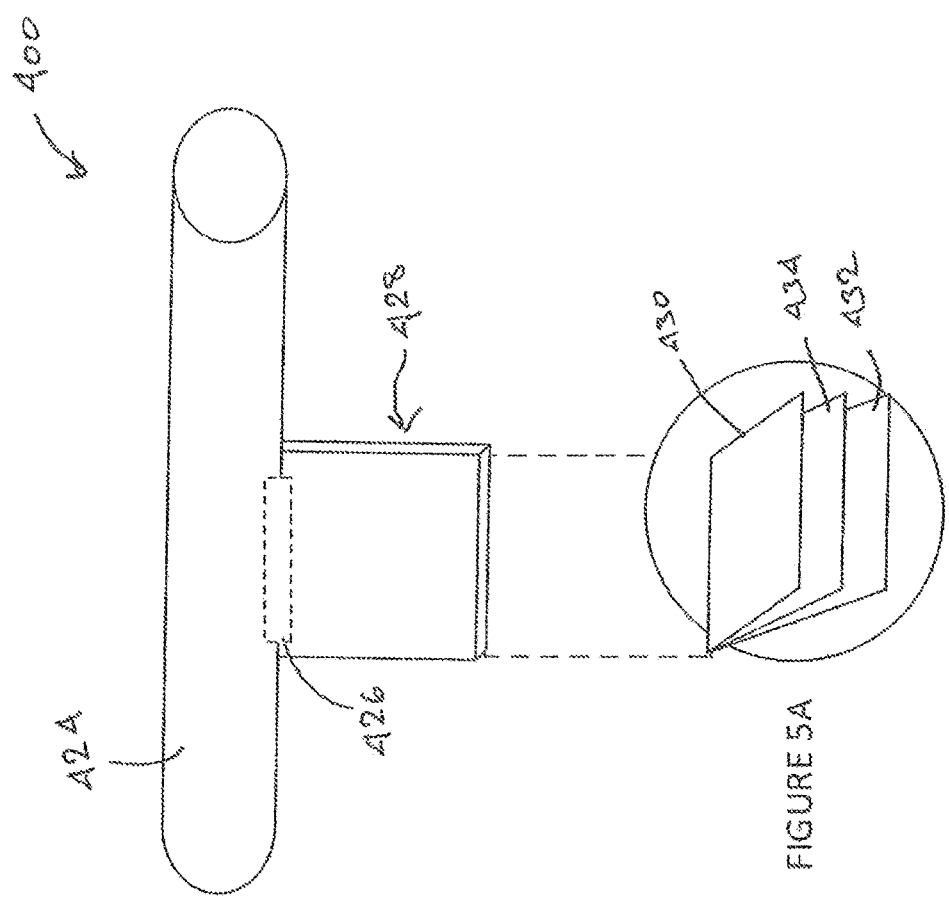
FIG. 5 depicts an embodiment of an ambient air/residue exposed hollow fiber membrane unit having permeate flowing into slotted or perforated pipe from permeate channels of the sheet membrane unit.

FIGS. 5 and 5A depict an embodiment of a draft membrane unit 400 having permeate flowing into slotted or perforated pipe from permeate channels of the sheet membrane unit which may be utilized in embodiments of the present invention. Membrane unit 400 has a slotted collection pipe 424 having a permeate collection pipe slot 426. A vacuum is applied to membrane unit 400 by vacuum generating device 16. A sheet membrane element 428 may have a top membrane sheet 430 and a bottom membrane sheet 432 glued only on three sides to a ribbed sheet 434, where a top permeate channel is defined between the top membrane sheet 430 and the ribbed sheet 434 and a bottom permeate channel is defined between the bottom membrane sheet 432 and the ribbed sheet 434. The fourth side of sheet membrane element is not glued comprising open ends of top and bottom membrane elements which extend over the permeate collection pipe slot 426. Permeate flows from collection pipe 400 to aeration blower 18.

Figure 6:
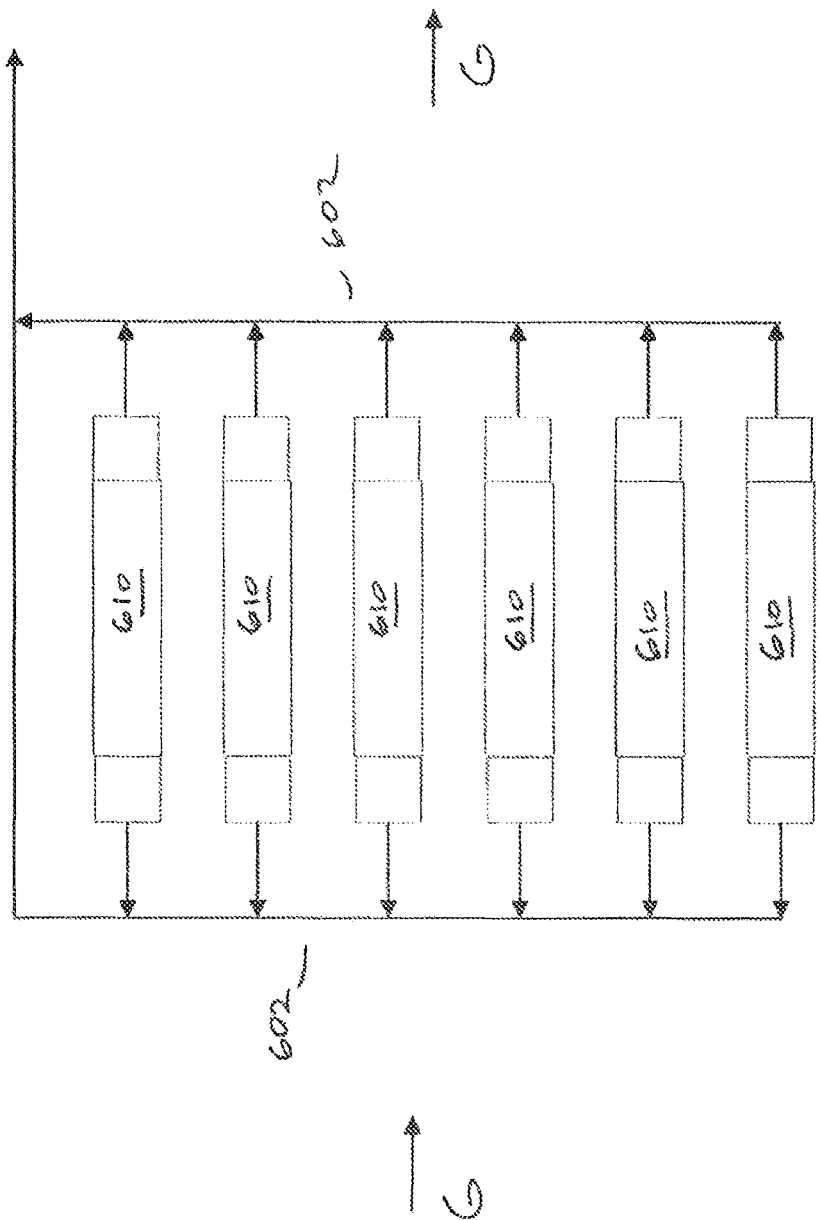
FIG. 6 depicts an embodiment of a bank of membrane units having the general configuration of the membrane units depicted in FIG. 2 and/or FIG. 3.

FIG. 6 depicts an embodiment of a draft membrane bank 600 of membrane units 610 having the general configuration of the membrane units 100, 200 described above and depicted in FIGS. 2 and/or 3 or the like. A vacuum is applied to the membrane units 610 by vacuum-generating device 16. The exteriors of the banked membrane units 610 are exposed to air G in an ambient environment. Oxygen, carbon dioxide and water vapor preferentially flow through the selective barrier of each membrane unit with permeate gas flowing out and collected through permeate headers 602 and directed to aeration blower 18.

Figure 7:
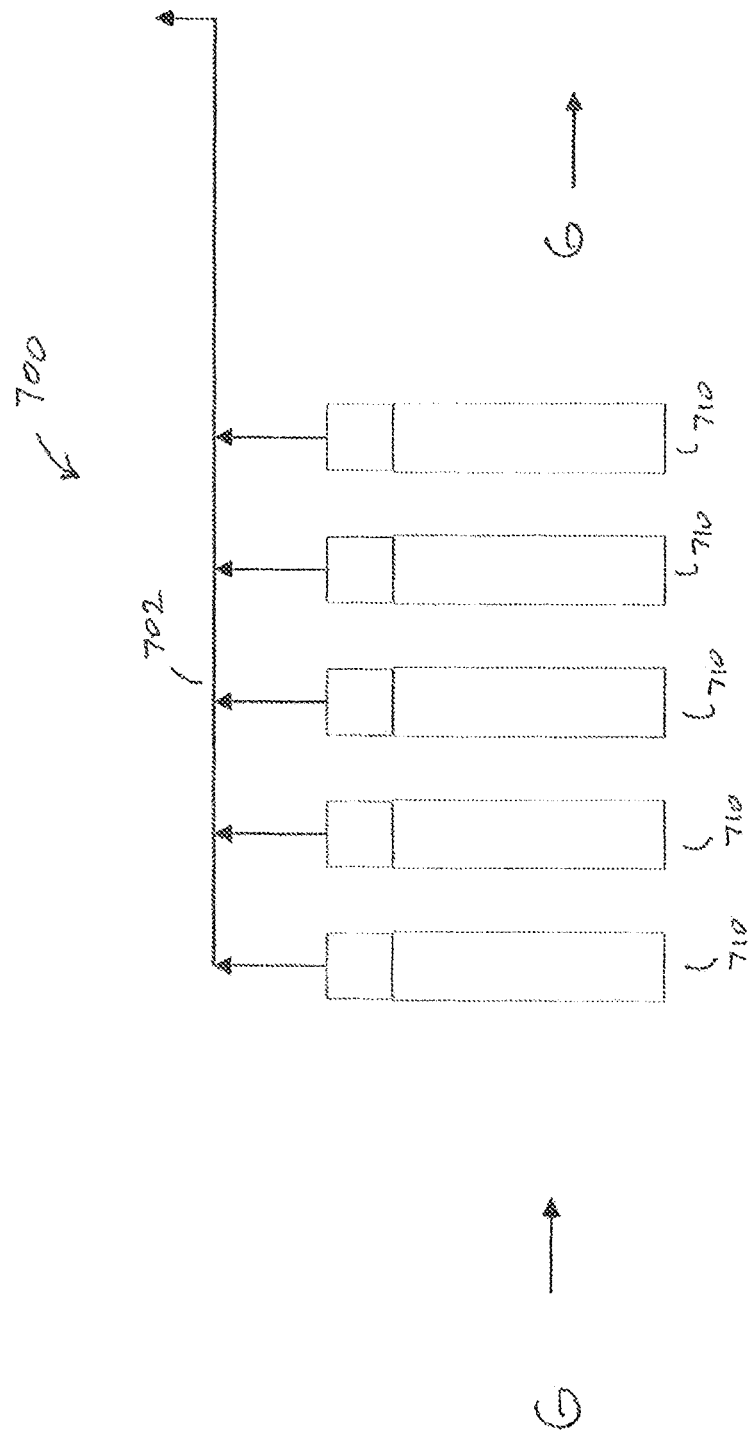
FIG. 7 depicts an embodiment of a bank of membrane units having the general configuration of the membrane units depicted in FIG. 4 and/or FIG. 5

FIG. 7 depicts an embodiment of a bank 700 of membrane units 710, which may include membrane units 300, 400 described above and depicted in FIGS. 4 and 5 or the like. A vacuum is applied to the membrane units 710 by vacuum-generating device 16. The exteriors of the banked membrane units 710 are exposed to air G in an ambient environment. Oxygen, carbon dioxide and water vapor preferentially flow through the selective barrier of each membrane unit 710 with permeate gas flowing out and collected through permeate header 702 and directed to aeration blower 18.

FIG. 8 depicts an embodiment of a bank 800 of membrane units 810, which may include membrane units 100, 200, 300, 400 described above and depicted in depicted in FIGS. 2, 3, 4, and/or 5 or the like. A vacuum is applied to the membrane units 810 by vacuum-generating device 16. The exteriors of the banked membrane units 810 are exposed to air G in an ambient environment. Oxygen, carbon dioxide and water vapor preferentially flow through the selective barrier of each membrane unit 810 with permeate gas flowing out and collected through permeate header 802 and directed to aeration blower 18.

Having thus described the invention, what is claimed as new and desired to be protected by Letters Patent includes the following:

1. A system for providing oxygen enriched air to a wastewater treatment aeration system comprising:
    a membrane unit comprising a membrane having a first surface and a second surface, the membrane configured such that as it receives atmospheric air comprising a first concentration of oxygen, the first concentration of oxygen is drawn into the first surface and passes through the membrane resulting in a permeate stream exiting the second surface wherein the permeate stream comprises a second concentration of oxygen greater than the first concentration of oxygen wherein the membrane unit comprises a plurality of membrane hollow fiber tubes set within a perforated shell;
    a vacuum-generating device configured to apply a vacuum to the membrane unit thereby pulling a flow of permeate from the membrane unit and discharge the flow of permeate at a pressure of atmospheric conditions or above; and
    an aeration blower which receives a first portion of the flow of permeate and pressurizes it for delivery to the wastewater treatment aeration system.

2. The system of claim 1 wherein a second portion of the flow of permeate is provided as an oxygen enriched air to a biogas fired power plant or any other flue gas generator.

3. The system of claim 2 wherein an exhaust gas stream from the biogas fired power plant or any other flue gas generator is transmitted to a heat recovery steam generator.

4. The system of claim 1 wherein membrane hollow fiber tubes have a first open end and a second open end and the membrane unit is configured for permeate flow from both the first open end and the second open end.

5. The system of claim 1 wherein the membrane hollow fiber tubes have a first open end and a second open end and the membrane unit is configured for permeate flow from both the first open end and the second open end.

6. The system of claim 1 wherein the membrane hollow fiber tubes have a first open end and a second closed end and the membrane unit is configured for permeate flow to the first open end.

7. The apparatus of claim 1 wherein a plurality of membrane units are configured into a membrane bank.

8. A process for providing oxygen enriched air to a wastewater treatment aeration system comprising the steps of:
    directing a flow of air to a membrane unit comprising a membrane having a first surface and a second surface, the membrane configured such that as it receives atmospheric air comprising a first concentration of oxygen, the first concentration of oxygen is drawn into the first surface and passes through the membrane resulting in a permeate stream exiting the second surface wherein the permeate stream comprises a second concentration of oxygen greater than the first concentration of oxygen, wherein the membrane unit comprises membrane hollow fiber tubes set within a perforated shell;
    applying a vacuum to the membrane unit to pull a flow of permeate from the membrane unit; and
    directing a first portion of the flow of permeate to an aeration blower which pressurizes the first portion of permeate for delivery to the wastewater treatment aeration system.

9. The process of claim 8 including the steps of:
    obtaining a second portion of the flow of permeate; and
    providing the second portion of the flow of permeate as an oxygen enriched air to a biogas fired power plant or any other flue gas generator.

10. A system for providing oxygen enriched air to a wastewater treatment aeration system comprising:
    a membrane unit comprising a plurality of membrane hollow fiber tubes set within a perforated shell, each membrane hollow fiber tube having an outer surface and an inner surface, each membrane hollow fiber tube configured such that as the membrane hollow fiber tube is exposed to atmospheric air comprising a first concentration of oxygen, the first concentration of oxygen is drawn into the outer surface and passes into an interior of the membrane hollow fiber tube resulting in a permeate stream which exits through an end of the membrane hollow fiber tube, wherein the permeate stream comprises a second concentration of oxygen greater than the first concentration of oxygen,
    a vacuum-generating device configured to apply a vacuum to the membrane unit thereby pulling a flow of permeate from the membrane unit and discharge the flow of permeate at a pressure of atmospheric conditions or above; and
    an aeration blower which receives a first portion of the flow of permeate and pressurizes it for delivery to the wastewater treatment aeration system.

11. The system of claim 10 wherein a second portion of the flow of permeate is provided as an oxygen enriched air to a biogas fired power plant or any other flue gas generator.

12. The system of claim 11 wherein an exhaust gas stream from the biogas fired power plant or any other flue gas generator is transmitted to a heat recovery steam generator.

13. The system of claim 10 wherein the membrane hollow fiber tubes have a first open end and a second open end and the membrane unit is configured for permeate flow from both the first open end and the second open end.

14. The system of claim 10 wherein each of the membrane hollow fiber tubes have a first open end and a second open end and the membrane unit is configured for permeate flow from both the first open end and the second open end.

15. A system for providing oxygen enriched air to a wastewater treatment aeration system comprising:

a membrane unit comprising a plurality of membrane hollow fiber tubes, each of the membrane hollow fiber tubes having a first surface and a second surface and each of the membrane hollow fiber tubes comprising a first open end and a second closed end, the membrane unit configured such that as it receives atmospheric air comprising a first concentration of oxygen, the first concentration of oxygen is drawn into the first surface of each of the membrane hollow fiber tubes and passes through the membrane hollow fiber tube resulting in a permeate stream exiting the second surface wherein the permeate stream comprises a second concentration of oxygen greater than the first concentration of oxygen, wherein the permeate stream is configured to flow to the first open end of each of the membrane hollow fiber tubes;

a vacuum-generating device configured to apply a vacuum to the membrane unit thereby pulling a flow of permeate from the membrane unit and discharge the flow of permeate at a pressure of atmospheric conditions or above; and an aeration blower which receives a first portion of the flow of permeate and pressurizes it for delivery to the wastewater treatment aeration system.

16. A system for providing oxygen enriched air to a wastewater treatment aeration system comprising:

a membrane comprising a sheet element comprising edges attached to a ribbed sheet, wherein a membrane envelope is defined between the sheet element and the ribbed sheet, the membrane having a first surface and a second surface, the membrane configured such that as it receives atmospheric air comprising a first concentration of oxygen, the first concentration of oxygen is drawn into the first surface and passes through the membrane resulting in a permeate stream exiting the second surface wherein the permeate stream comprises a second concentration of oxygen greater than the first concentration of oxygen;

a vacuum-generating device configured to apply a vacuum to the membrane thereby pulling a flow of permeate from the membrane and discharge the flow of permeate at a pressure of atmospheric conditions or above; and an aeration blower which receives a first portion of the flow of permeate and pressurizes it for delivery to the wastewater treatment aeration system.

* * * * *